April 5, 1938.   G. H. LELAND   2,113,451
DEVICE FOR CONTROLLING THE AXIAL THRUST OF A SHAFT
Filed Oct. 22, 1935
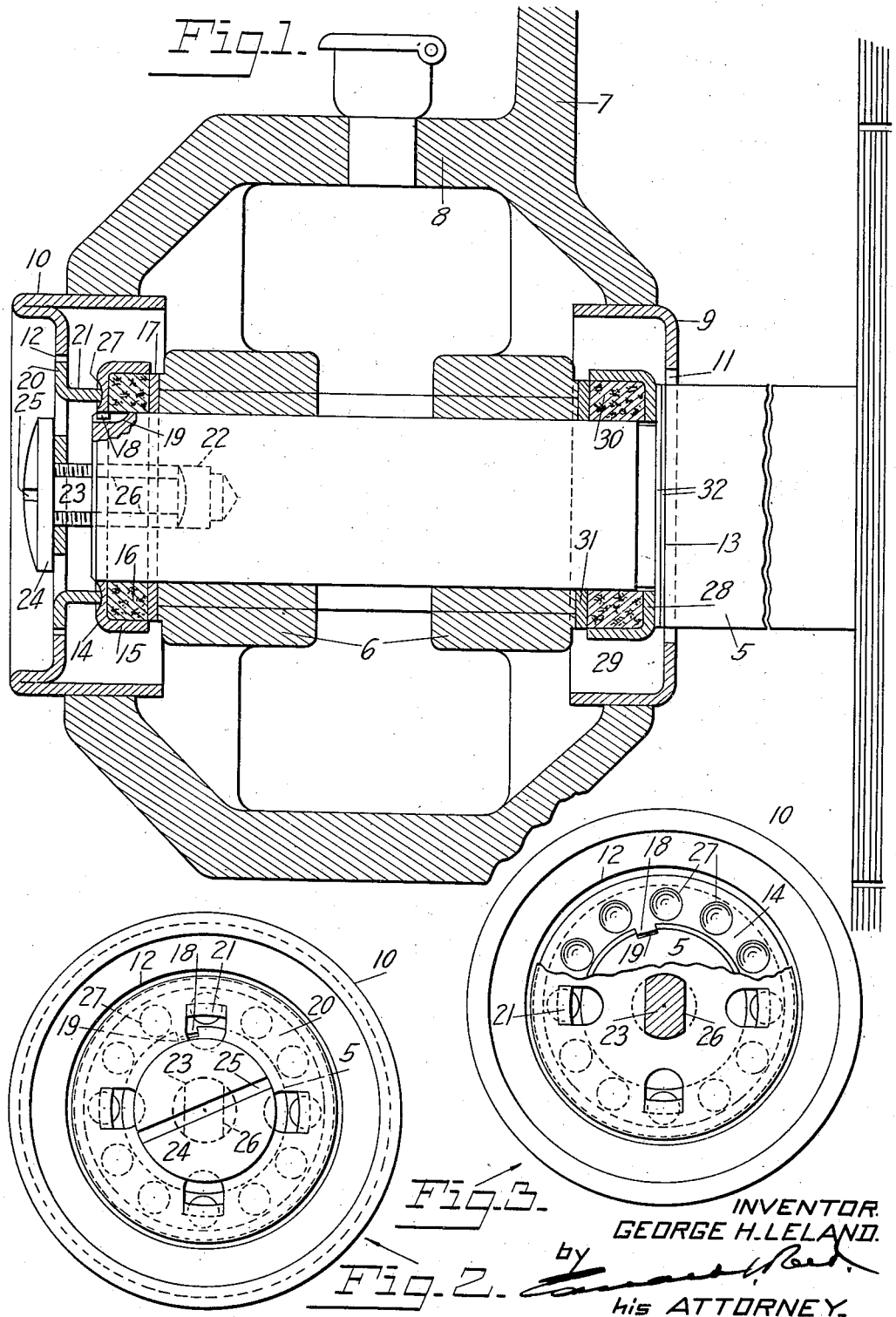
INVENTOR.
GEORGE H. LELAND.
by
his ATTORNEY.

Patented Apr. 5, 1938

2,113,451

UNITED STATES PATENT OFFICE 2,113,451

DEVICE FOR CONTROLLING THE AXIAL THRUST OF A SHAFT

George H. Leland, Dayton, Ohio, assignor to The Leland Electric Company, Dayton, Ohio, a corporation of Ohio Application October 22, 1935, Serial No. 46,155

16 Claims. (Cl. 308—166)

This invention relates to a device for controlling the axial thrust of a shaft and is designed more particularly for controlling the end play of a motor shaft. Various devices have been provided for taking up the end play of a shaft but these devices, for the most part at least, have been of such a character that it is difficult to effect the adjustment, it often being necessary to partially disassemble the motor in order to make the adjustment, and they are not capable of fine adjustment.

One object of the invention is to provide a device which will prevent any substantial axial movement of the shaft and will eliminate all noise due to such movement.

A further object of the invention is to provide such a device which can be adjusted to prevent the axial movement of the shaft without offering any substantial frictional resistance to its rotation, and in which very fine adjustments can be secured to limit the axial movement of the shaft to extremely small tolerances.

A further object of the invention is to provide such a device in which adjustment may be effected from the exterior of the motor casing.

A further object of the invention is to provide such a device which after having been adjusted will be firmly retained in its adjusted position.

A further object of the invention is to provide such a device which will be simple in construction and operation and inexpensive to build and install.

Other objects of the invention may appear as the device is described in detail.

In the accompanying drawing Fig. 1 is a longitudinal sectional view taken through a bearing and showing a shaft equipped with my invention; Fig. 2 is an end elevation of the device; and Fig. 3 is an end elevation, partly broken away, and with the supporting stud in section.

In the drawing I have illustrated the invention as applied to the shaft 5 of an electric motor which is journaled in a bearing 6 carried by the motor frame 7 and enclosed in a housing 8. The housing is provided at each end with an opening, in which openings are inserted closures or caps 9 and 10, which in turn are provided with openings 11 and 12. In the present construction the journal portion of the shaft is reduced in diameter thus providing the shaft with a shoulder 13 facing the inner end of the bearing. The outer end portion of the shaft projects a short distance beyond the outer end of the bearing.

In the present arrangement the device for preventing end play of the shaft cooperates with the end of the bearing but it will be obvious that it would cooperate equally well with any other suitable structure which extended about the shaft and was held against movement lengthwise of the shaft. This device, which is preferably annular in form, is mounted in opposed relation to one end of the bearing and is so connected with the shaft that it will cooperate with the bearing to resist the axial movement of the shaft in an inward direction, and it is here shown as arranged about the end of the shaft which projects beyond the bearing. It is preferably yieldable to cushion the thrust of the shaft and eliminate noise, and in the form illustrated it comprises an annular shell consisting of a radial web 14 extending about the shaft and a flange 15 extending from the outer edge of the web toward the bearing and spaced from the shaft. Mounted within the shell and confined between the flange 15 and the shaft is a body of yieldable material, such as a ring of cork 16. Preferably the annular device also includes a wear resisting element, such as a washer 17, which is interposed between the end of the bearing and the cork ring to reduce the wear on the latter. This washer may be of such a diameter that, when the cork ring does not project beyond the inner edge of the flange 15, the washer may enter the shell and thus permit the cork to be compressed by the thrust of the shaft thereon. This annular device is slidably mounted on the end of the shaft so that it may have a limited axial movement with relation thereto, and in the present instance the device is so connected with the shaft that it will rotate therewith, this being accomplished by providing the web 14 of the shell with a tongue 18 which extends into a groove 19 in the shaft.

The annular device is held against outward movement with relation to the shaft by a retaining member 20 which is connected with the shaft and is adjustable with relation thereto to properly position the annular device with relation to the end of the bearing. In the present instance this retaining member is in the form of a circular plate having inwardly extending projections 21 which engage the metal shell of the annular device. The connecting member may be supported on the shaft and adjusted with relation thereto in any suitable manner and, in the construction shown, the end portion of the shaft has an axial bore 22 which is screw threaded to receive a screw threaded stud 23 which projects outwardly beyond the end of the shaft and has at its outer end a head 24 provided with means whereby the screw may be adjusted in the bore 22, such as a kerf 25 to receive the bit of a screw driver. This stud extends through an opening in the plate 20 and the head bears against the outer surface of that plate so as to hold the latter against outward movement with relation to the stud. The plate is preferably so connected with the stud that it will be caused to rotate with the stud and, in the form illustrated, the sides of the stud are flattened, as best shown at 26 in Fig. 3, and the opening in the plate 20 is of corresponding shape.

It will be apparent therefore that when the screw is rotated with relation to the shaft in a direction to move the same inwardly the plate 20 will be moved inwardly and will move the annular device, with relation to the shaft, toward the end of the bearing and then hold the same against movement with relation to the shaft in the other direction. Thus the shaft is held against axial movement in an inward direction with relation to the annular device and, the annular device being held against inward movement by the bearing, it follows that the shaft can have no appreciable axial movement in an inward direction. Any such movement that may develop during the operation of the motor may be eliminated by adjusting the screw. By providing the screw with fine threads very fine adjustments of the annular device may be secured and the latter may be so positioned that it will prevent any appreciable axial movement of the shaft, in an inward direction, without causing binding or undue frictional contact between the parts. The screw is rotated with relation to the shaft only when adjustment is to be effected and at ather times the screw, retaining member 20 and the annular device rotate with the shaft. The arrangement of the adjusting screw is such that it is readily accessible from the exterior of the motor so that adjustment may be effected without disassembling the motor or removing any part thereof. In the arrangement shown, the retaining plate 20 is located in the opening 12 of the cap 10 at the outer end of the housing 8 and the screw head 24 is arranged in a cavity in the outer portion of that cap and is thus at all times exposed for manipulation.

In order to lock the supporting and adjusting stud 23 in adjusted positions, and thus retain the annular device in proper cooperative relation with the bearing, the shell of the annular device and the plate 20 have interengaging parts so arranged as to permit the plate 20 to be rotated with relation to the annular device for the purpose of adjustment but to prevent any accidental or unintentional movement of the plate 20 or its supporting stud. In the arrangement here shown the outer face of the shell of the annular device is provided with an annular series of recesses 27 and the projections 21 on the plate 20 are arranged to enter these recesses when the plate is rotated. Due to the resiliency of the plate and of the yieldable material in the annular device the projections 21 will ride into and out of the recesses as the plate is rotated and at the end of the adjustment will be seated in the recesses so as to firmly hold the plate, and consequently the adjusting stud, against movement with relation to the annular device or the shaft. The recesses 27 are spaced relatively short distances apart, there being in the present instance twelve of them, so that very fine adjustments can be secured, as obviously the rotation of a screw having a low pitch thread through one twelfth of a rotation will impart an extremely small axial movement to the screw. There may be any suitable number of projections 21 on the plate 20 but, in the present instance, I have shown four such projections, which have been formed by striking the same from the body of the plate.

The shaft 5 may be held against axial movement in the other or outer direction by any suitable means, such as a device, similar to that above described, applied to the shaft at the outer end of the bearing on the other side of the motor. However, in the present instance, I have shown means cooperating with the one bearing for holding the shaft against axial movement in either direction. For this purpose I have interposed between the shoulder 13 on the shaft and the inner end of the bearing, an annular yieldable device similar to that above described and comprising an annular shell having a radial web 28 arranged adjacent to the shoulder 13 and a flange 29 projecting toward the bearing. A cork ring 30 is mounted in the shell and a wear resisting washer 31 is interposed between the cork ring and the end of the bearing. If desired one or more washers 32 may be interposed between the radial web of the shell and the shoulder 13.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In combination with a shaft and a bearing therefor, an annular device adjustably mounted at one end of said bearing and adapted to cooperate therewith to resist the axial movement of said shaft in one direction, a support mounted on and adjustable lengthwise of said shaft, a member carried by said support and adjustable thereby, said member extending radially beyond said shaft and acting on said annular device to hold said shaft against axial movement in one direction with relation to said annular device and to control the cooperative relation of said annular device with said bearing, and means to resist the axial movement of said shaft in the other direction.

2. In combination with a shaft and a bearing therefor, an annular device adjustably mounted at one end of said bearing, said bearing serving to limit the axial movement of said annular device in one direction, an axial stud extending into and having screw threaded connection with the end of said shaft and axially adjustable with relation thereto and having a head at its outer end, a plate mounted on said stud in engagement with the head thereof, extending radially beyond said shaft and having parts engaging said annular device to hold said shaft against axial movement in one direction with relation to said annular device and to control the position of said annular device with relation to said bearing, and means to resist the axial movement of said shaft in the other direction.

3. In combination with a shaft and a bearing therefor, a device mounted at one end of said bearing for adjustment lengthwise thereof, said bearing serving to limit the movement of said device in one direction lengthwise of said shaft, a member carried by said shaft and acting on said device to hold said shaft against axial movement in one direction with relation to said device, separate means for adjusting said member to control the position of said device with relation to said bearing, means to retain said member in its adjusted position during the rotation of said shaft, and means to resist the axial movement of said shaft in the other direction.

4. In combination with a bearing and a shaft mounted in said bearing, an annular structure mounted about said shaft and having a flange extending toward said bearing and spaced from said shaft, yieldable material confined between said flange and said shaft, a wear resisting element interposed between said yieldable material and said bearing and movable axially with relation to said annular structure, and a member supported on said shaft for adjustment lengthwise thereof and acting on said annular structure to control the position of said wear resisting element with relation to said bearing and to hold said shaft against axial movement in one direction with relation to said annular structure.

5. In combination with a bearing and a shaft mounted in said bearing, an annular structure mounted about said shaft, having a flange extending toward said bearing and spaced from said shaft, yieldable material confined between said flange and said shaft, a wear resisting element interposed between said yieldable material and said bearing and movable axially with relation to said annular structure, a member acting on said annular structure to control the position of said wear resisting element with relation to said bearing and to hold said shaft against axial movement in one direction with relation to said annular structure, a support for said member mounted on said shaft and having an adjustable part to control the position of said annular structure with relation to said shaft and said bearing.

6. In combination with a bearing and a shaft mounted in said bearing, an annular structure mounted about said shaft and having a flange extending toward said bearing and spaced from said shaft, yieldable material confined between said flange and said shaft, a wear resisting element interposed between said yieldable material and said bearing and movable axially with relation to said annular structure, a member acting on said annular structure to hold said shaft against axial movement in one direction with relation to said annular structure, and a stud extending lengthwise of said shaft beyond the end thereof and having screw threaded connection with said shaft, said stud extending through said member and having a part engaging the outer part of said member to control the position of the latter.

7. In combination with a bearing and a shaft mounted in said bearing, an annular structure mounted about said shaft and having a flange extending toward said bearing and spaced from said shaft, yieldable material confined between said flange and said shaft, a wear resisting element interposed between said yieldable material and said bearing and movable axially with relation to said annular structure, a member acting on said annular structure to hold said shaft against axial movement in one direction with relation to said annular structure, and a support for said member mounted on said shaft and having an adjustable part to control the position of said annular structure with relation to said shaft and said bearing, said annular structure and said member having cooperating parts to hold the same against relative displacement during the rotation of said shaft.

8. In combination with a shaft and a bearing therefor, an annular device engaging one end of said bearing and connected with said shaft for rotation therewith and for axial movement with relation thereto, a support connected with said shaft for rotation therewith and having a part adjustable lengthwise of said shaft and rotatable with relation to said shaft, and a member connected with said part of said support for both axial and rotary movement therewith and acting on said annular device to move the latter toward said bearing and to hold said shaft against axial movement in one direction with relation to said annular device, said annular device and said member having cooperating parts to hold said part of said support against movement with relation to said shaft during the rotation of the latter.

9. In combination with a shaft and a bearing therefor, an annular device engaging one end of said bearing and connected with said shaft for rotation therewith and for axial movement with relation thereto, a stud extending axially beyond the end of said shaft and having screw threaded connection therewith, a member mounted on said stud for both axial and rotary movement therewith and acting on said annular device to control the position thereof with relation to said shaft and to hold said shaft against axial movement in one direction with relation to said annular device, said annular device having an annular series of recesses in the outer face thereof and said member having projections arranged to ride into and out of said recesses when said member is rotated by said stud with relation to said shaft.

10. In combination with a shaft and a bearing therefor, said shaft having a shoulder near one end of said bearing and having its other end projecting beyond said bearing, a yieldable device mounted on said shaft near each end of said bearing, each yieldable device comprising an annular shell having a radial portion spaced from the adjacent end of said bearing, and a flange extending toward said bearing, a body of yieldable material supported within said shell, and a wear resisting element interposed between said body of material and the end of said bearing, a member mounted on said shaft and engaging one of said yieldable devices to hold said shaft against axial movement in one direction with relation to said yieldable device, and means acting on said member to cause the same to move the yieldable device which is engaged thereby against the adjacent end of said bearing and to cause the shoulder on said shaft to press the other yieldable device against the other end of said bearing.

11. In combination with a shaft, a structure extending about said shaft and held against movement with relation thereto, an annular device mounted about said shaft adjacent to said structure and adjustable lengthwise of said shaft, an adjustable member acting on said device to move the same into engagement with said structure and hold said shaft against axial movement in one direction with relation to said annular device, and an adjusting device carried by said shaft and adjustable lengthwise thereof for adjusting said member.

12. In combination with a shaft and a structure extending about said shaft and held against movement with relation thereto, an annular device mounted about said shaft adjacent to said structure for rotation with said shaft and for adjustment lengthwise thereof, an adjustable member acting on said device to move the same into engagement with said structure and to hold said shaft against axial movement in one direction with relation to said annular device, and a device carried by said shaft and adjustable lengthwise thereof for adjusting said member, said member and the last mentioned device being connected one to the other for rotation in unison and said member and said annular device having cooperating parts to retain said last mentioned device in its adjusted position with relation to said shaft during the rotation of the latter.

13. In combination with a bearing and a shaft mounted in said bearing, a device mounted about said shaft for adjustment lengthwise thereof, said bearing serving to limit the movement of said device lengthwise of said shaft in one direction, a member acting on said device to control the position thereof with relation to said bearing and shaft, and a device carried by said shaft having a part adjustable lengthwise of said shaft and acting on said member to adjust the latter and to hold said shaft against lengthwise movement in one direction with relation to said member.

14. In combination with a bearing and a shaft mounted in said bearing, a device mounted about said shaft for adjustment lengthwise thereof, said bearing serving to limit the movement of said device lengthwise of said shaft in one direction, a member acting on said device to control the position thereof with relation to said bearing and said shaft, a device carried by said shaft and having a part adjustable lengthwise of said shaft and acting on said member to adjust the latter and to hold said shaft against lengthwise movement in one direction with relation to said member, and means for retaining said member in its adjusted position with relation to said shaft during the rotation of the latter.

15. In combination with a bearing and a shaft mounted in said bearing, a device mounted about said shaft for adjustment lengthwise thereof and for rotation therewith, said bearing serving to limit the lengthwise movement of said device in one direction, a stud carried by said shaft and projecting beyond the end thereof, a part carried by said stud and adjustable lengthwise of said shaft, and a member supported by said stud, adjustable lengthwise of said shaft by said part and acting on said device to control the position thereof with relation to said bearing and said shaft and to hold said shaft against lengthwise movement in one direction with relation to said device.

16. In combination with a shaft and a bearing therefor, an annular device mounted at one end of said bearing and held against axial movement in one direction, an adjustable member to engage said annular device and hold the same against movement in the other direction with relation to said shaft, and an adjustable stud having screw threaded connection with said shaft, projecting lengthwise beyond the end thereof and having a part engaging said member to hold the latter in a selected position with relation to said shaft.

GEORGE H. LELAND.